(12) United States Patent
Dworatzek et al.

(10) Patent No.: US 7,604,128 B2
(45) Date of Patent: Oct. 20, 2009

(54) FILTER APPARATUS

(75) Inventors: Klemens Dworatzek, Edingen (DE); Ralf Bauder, Ketsch (DE)

(73) Assignee: Mann & Hummel GmbH, Ludwigsburg (DE)

( * ) Notice: Subject to any disclaimer, the term of this patent is extended or adjusted under 35 U.S.C. 154(b) by 82 days.

(21) Appl. No.: 11/723,167

(22) Filed: Mar. 16, 2007

(65) Prior Publication Data
US 2007/0284301 A1  Dec. 13, 2007

(30) Foreign Application Priority Data
Mar. 16, 2006  (DE) ........................ 10 2006 012 591

(51) Int. Cl.
*B01D 35/30*  (2006.01)
*B01D 25/00*  (2006.01)
*B01D 35/00*  (2006.01)
*B01D 46/00*  (2006.01)

(52) U.S. Cl. ........................ 210/455; 210/437; 210/441; 210/445; 210/451; 55/496; 55/505; 55/507; 55/510

(58) Field of Classification Search ........................ None
See application file for complete search history.

(56) References Cited

U.S. PATENT DOCUMENTS

| 5,431,588 | A | * | 7/1995 | Kucik | ........................ 440/88 L |
| 5,882,367 | A | | 3/1999 | Morgan et al. | |
| 5,888,384 | A | * | 3/1999 | Wiederhold et al. | ......... 210/130 |
| 6,485,637 | B2 | * | 11/2002 | Jainek et al. | ................. 210/130 |

\* cited by examiner

*Primary Examiner*—Krishnan S Menon
*Assistant Examiner*—Madeline Gonzalez
(74) *Attorney, Agent, or Firm*—Crowell & Moring LLP

(57) ABSTRACT

A filter apparatus including a housing (2) and a filter insert (4), with an inlet opening formed on the housing (2) and an outlet fitting (6) mounted on a housing wall. The outlet fitting (6) has a contact face (7) for contact with the housing (2) and is provided with a tubular segment (13), which protrudes through an opening (9) of the housing, and a mounting element (22) is attached to the tubular segment (13) such that a region (10) of the housing (2) surrounding the opening (9) is clamped between the contact face (7) of the outlet fitting (6) and the mounting element (22).

14 Claims, 4 Drawing Sheets

FILTER APPARATUS

BACKGROUND OF THE INVENTION

The present invention relates to a filter apparatus comprising a housing and a filter insert arranged in the housing between an inlet opening and an outlet.

U.S. Pat. No. 5,882,367 discloses a filter apparatus in which a filter cartridge is disposed in a substantially cylindrical housing. On the lateral surface of the filter housing, an inlet opening is provided, which communicates with an annular space formed between the filter cartridge and the housing. Within the filter cartridge, a chamber is formed from which the filtered air is discharged through an outlet fitting. The outlet fitting is fixed in snap-in relation to the end face of the housing.

In this known arrangement, the connection fitting for the air outlet is inserted into an opening of the housing in snap-in relation. For this purpose, the material of the housing must, on the one hand, be sufficiently elastic to enable the temporary deflection necessary for the snap-in connection. On the other hand, the material must have sufficient rigidity to hold the connection fitting securely on the housing. These requirements can at best be satisfied by expensive synthetic resin materials, which would, however, result in very expensive filter devices and therefore do not usually come into consideration.

SUMMARY OF THE INVENTION

An object of the present invention is to provide an improved filter apparatus.

Another object is to provide a filter apparatus in which a dimensionally stable and play-free arrangement of the outlet fitting on the housing can be achieved in a simple manner.

A further object of the invention is to provide a filter apparatus having a housing with an outlet fitting mounted thereof which can be produced in a cost effective manner.

These and other objects are achieved in accordance with the present invention by providing a filter apparatus comprising a housing with an inlet opening formed therein and a further opening formed in a housing wall; a filter insert arranged in the housing in a flow path between the inlet opening and the further opening; an outlet fitting having a tube segment which protrudes through the further opening and a contact face for contacting the housing wall surrounding the further opening; and a mounting element affixed to the tube segment such that a region of the housing surrounding the further opening is clamped between the contact face of the outlet fitting and the mounting element.

In the present invention, a filter device is provided in which the outlet fitting is mounted play-free on the housing. Due to the possible material selection, high stiffness and a long service life of the connection can be achieved. Because the region of the housing surrounding the opening receiving the outlet fitting is clamped between a contact face of the outlet fitting and the mounting element, no additional sealing means are required. The play-free arrangement is achieved in that any dimensional tolerances of the parts to be mounted are compensated in a simple manner. A further advantage is that the entire system can be easily adjusted through a strict separation between holding forces and mounting forces. For outlet fittings that extend in a curve, an adjustment in the desired direction of the outlet is possible even after mounting.

According to a preferred embodiment of the invention, a mounting ring is provided as the mounting element, which is fixed to the lateral surface of the tube segment. This mounting ring has the advantage that it can be easily mounted to the tube segment and forms a support face over the entire circumference of the opening relative to the housing, so that sufficient contact force is provided even though the surface pressure is low. It is furthermore advantageous that the contact face of the outlet fitting is formed on an annular flange of the outlet fitting.

One advantageous embodiment for fixing the mounting ring on the tube segment is that a snap-in or locking connection is provided. As a result, the mounting ring only needs to be pushed onto the tube segment until it automatically snaps into place. For the design of the snap-in or locking connection it is advantageous if at least one circumferential projection is formed either on the tube segment or on the mounting ring and cooperates with a radial projection or a radial recess formed on the other component. Because the projection is circumferential, no special rotational position of the mounting ring is required in relation to the tube segment, so that mounting is further simplified. On the other hand, the holding forces are distributed over the entire circumference.

In another embodiment of the locking connection it is advantageous that both the tube segment and the mounting ring are provided with a circumferential projection, and an insertion taper or an inclined insertion surface are provided in front of the respective projection as seen in mounting direction. This configuration of an insertion taper or an inclined insertion surface causes a gradual widening or constriction until the maximum required dimensional change is reached, so that any impermissible mechanical stress of the material is avoided. It is considered a further advantageous measure that, behind the respective projection or recess as seen in mounting direction, a wedge-shaped geometry is formed by the inclined faces, which causes the mounting ring to be securely seated in the region of the housing which surrounds the opening for receiving the tube segment, and the ring is furthermore pressed against this region with a corresponding force. In a further embodiment of the locking connection, an annular groove may be provided on the tube segment, which is limited by the inclined face and with which the projection formed on the mounting ring engages. As a result of this measure, greater radial widening is required in the extraction direction of the mounting ring, so that the mounting ring is secured on the tube segment with a high holding force.

In an alternative kind of attachment of the mounting ring on the tube segment, the mounting ring has an internal thread and the tube segment an external thread, so that the mounting ring is screwed onto the tube segment. In this type of attachment, the mounting ring is screwed far enough onto the tube segment until the region of the housing surrounding the opening is clamped between the annular flange of the connection fitting and the mounting ring. To further secure the mounting ring on the tube segment, it is considered advantageous if a device preventing unscrewing is provided on the mounting ring and/or the tube segment. In this manner, the mounting ring is secured on the tube segment even if the outlet fitting is rotated relative to the housing in a direction that corresponds to the unscrewing direction of the thread.

In yet another embodiment, the mounting ring can have a radially outwardly directed flange on which one end of the filter insert rests. Preferably, the housing has a substantially cylindrical form, and the filter insert is configured as a filter cartridge. In an embodiment of this kind it is advantageous if the outlet fitting is disposed on an end face of the housing and centric relative to the filter cartridge. To support the filter material against radially inwardly acting forces in the filter cartridge, it is advantageous if a support grid extending within the filter cartridge at least across a portion of the axial length is disposed at the free end of the tube segment. The support grid can be formed of the same material as the connection fitting, such that an integral production is preferred.

In another advantageous embodiment, an axial segment is formed at the end face of the housing and merges into a radial shoulder in which is located the opening that allows the tube segment to pass through. This radial segment forms a corresponding space for the mounting ring. A configuration of this type is dimensionally stable even if the walls are relatively thin.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
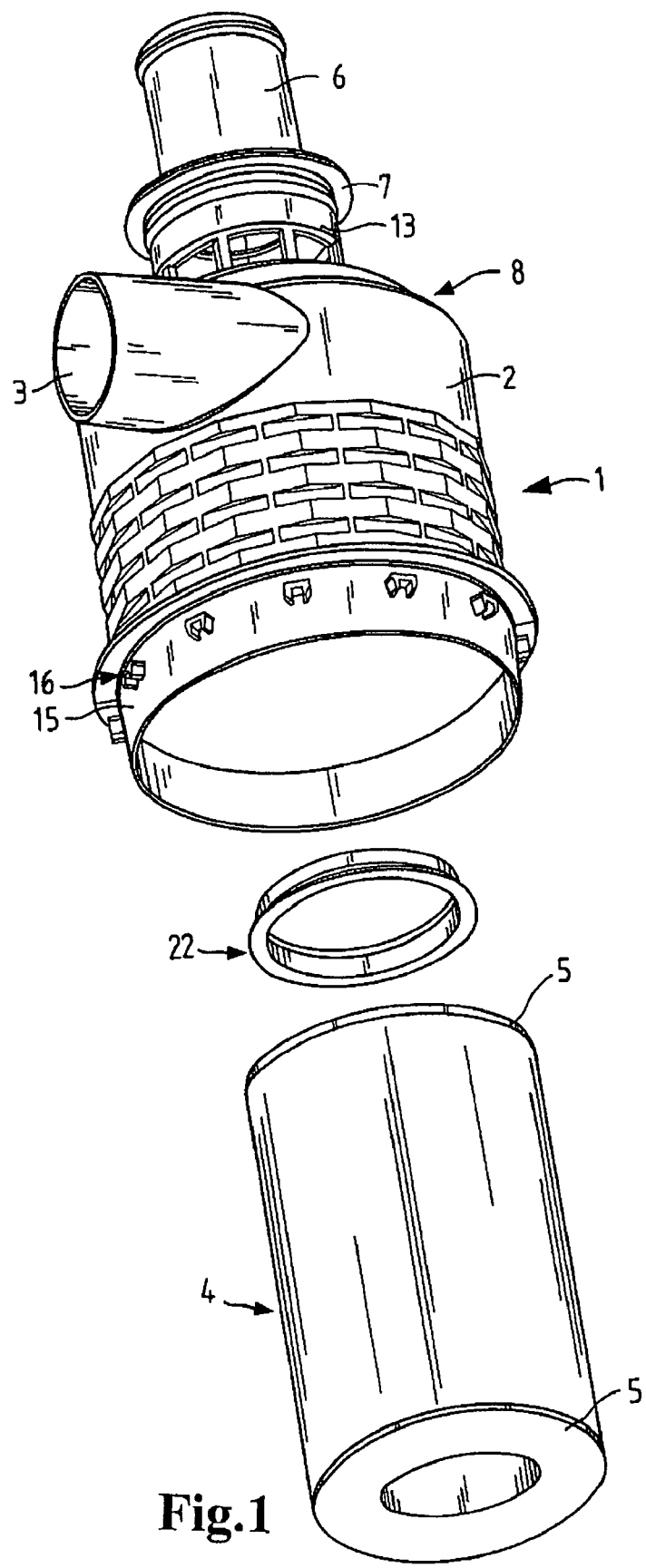
FIG. 1 is an exploded view showing parts of a filter apparatus according to the invention.

FIG. 1 shows an air filter 1 with a housing 2, which is substantially cylindrical. On the lower margin 15 of the housing 2, a lower housing section is disposed, which is not depicted in the drawing. To this end, the lower margin 15 has a plurality of projections 16 which are distributed across the circumference and engage the other housing section in a form-fit connection. On the lateral surface of the housing 2, an inlet fitting 3 is provided in which an inlet opening is formed. At one end face 8 of the housing 2 an outlet fitting 6 is disposed, which has an annular flange 7, from which a tube segment 13 extends into the interior of the housing 2. A filter element, which in the embodiment depicted in FIG. 1 is a filter cartridge 4, is inserted into the housing 2. At each of its axial ends, this filter cartridge 4 has a closure 5 formed of an elastic material, for example, in which the ends of the filter material are embedded. FIG. 1 furthermore shows a mounting ring 22, which is pushed onto the tube segment 13 of the outlet fitting 6 from the inside and is fixed thereto.

Figure 2:
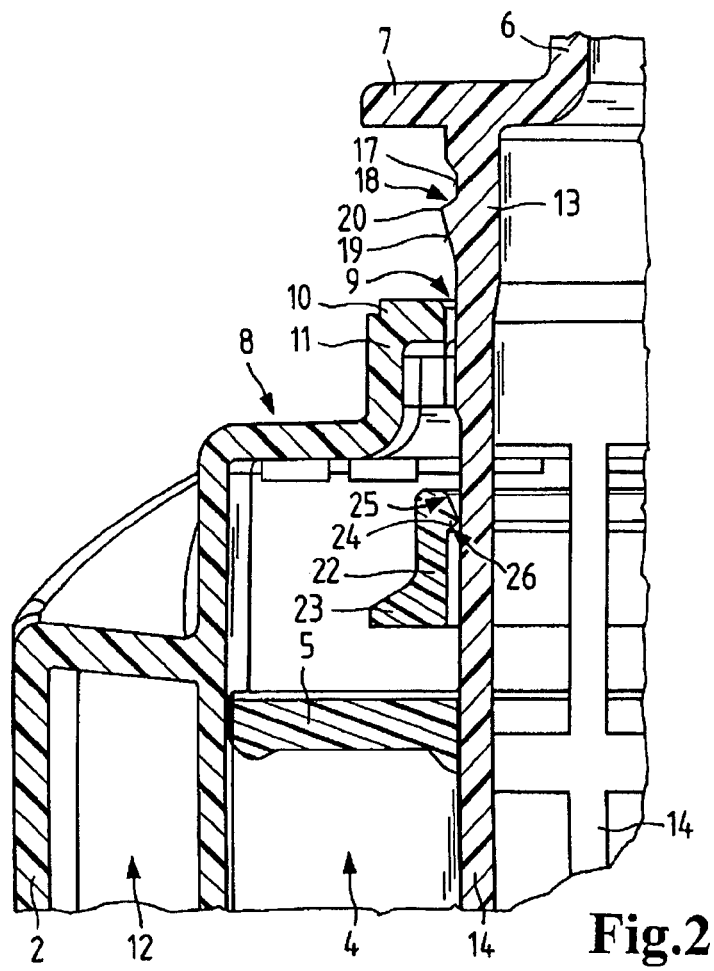
FIG. 2 is a longitudinal section of the upper part of the filter housing showing a portion of the connection fitting and the mounting ring.

FIG. 2 is a longitudinal section of the upper area of the housing 2 during mounting of the connection fitting 6 to the end face 8. On the connection fitting 6, below the annular flange 7, is located the tube segment 13, at the free end of which, i.e. facing the interior of the housing 2, a support grid 14 is formed. The connection fitting 6 is inserted, with the support grid 14 first, through the centric opening 9 of the end face 8. The connection fitting 6 is inserted far enough until the annular flange 7 contacts a radial shoulder 10 of the end face 8 of the housing 2. The radial shoulder 10 is formed onto an axial segment 11 of the end face 8.

As FIG. 2 further shows, the tube segment 13, on its outer lateral surface has an annular groove 17, on whose end which faces the interior of the housing 2, a circumferential projection 20 is provided. The circumferential projection 20 has an insertion taper 19 as seen in mounting direction, i.e., in the insertion direction of the tube segment 13, and an inclined face 18 sloping toward the annular groove 17. A mounting ring 22 having a circumferential projection 24 on its inner lateral surface is pushed over the support grid 14. As seen in mounting direction, i.e. toward the radial shoulder 10, the inner contour is configured as an inclined insertion surface 25, so that, as the tube segment 13 and the mounting ring 22 are pushed into each other, a gradual widening is effected by the insertion taper 19 and the inclined insertion surface 25. Adjacent the other side of the circumferential projection 25 is an inclined face 26, the angle of which corresponds at least substantially to the inclined face 18 on the tube segment 13. On the side facing the filter cartridge 4, the mounting ring 22 has a radial flange 23.

FIG. 2 shows a portion of the filter cartridge 4, but the filter cartridge is not inserted into the housing 2 until after the connection fitting 6 has been fixed to the end face 8 of the housing 2 by snapping the mounting ring 22 onto the tube segment 13. As may further be seen from FIG. 2, an annular space 12, into which opens the inlet fitting 3 depicted in FIG. 1, is located between the wall of the housing 2 and the filter cartridge 4.

Figure 3:
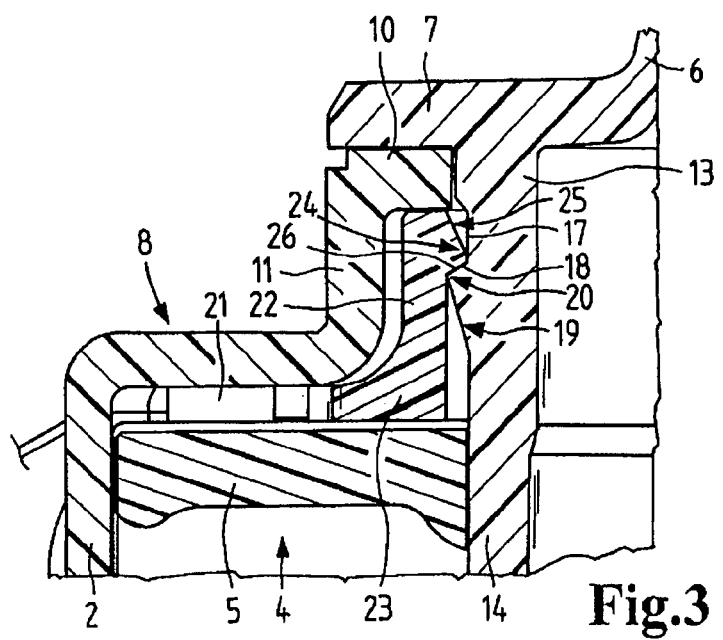
FIG. 3 is a slightly enlarged detail view of the section shown in FIG. 2 with the fitting in locked condition.

FIG. 3 shows a slightly enlarged detail from FIG. 2 in the mounted state of the connection fitting 6 on the end face 8 of the housing 2. Here, the annular flange 7 rests on the radial shoulder 10. The mounting ring 22 is pushed far enough onto the tube segment 13 that the circumferential projection 24 engages the circumferential projection 20 on the tube segment 13. The inclined faces 18 and 26 form a wedge-shaped geometry that presses the mounting ring 22 against the inside of the radial shoulder 10, so that the radial shoulder 10 is clamped between the annular flange 7 and the mounting ring 22. The circumferential projection 24 is located within the annular groove 17 on the tube segment 13. The function of the inclined insertion surface 25 and the insertion taper 19 has already been explained with reference to FIG. 2.

Figure 4:
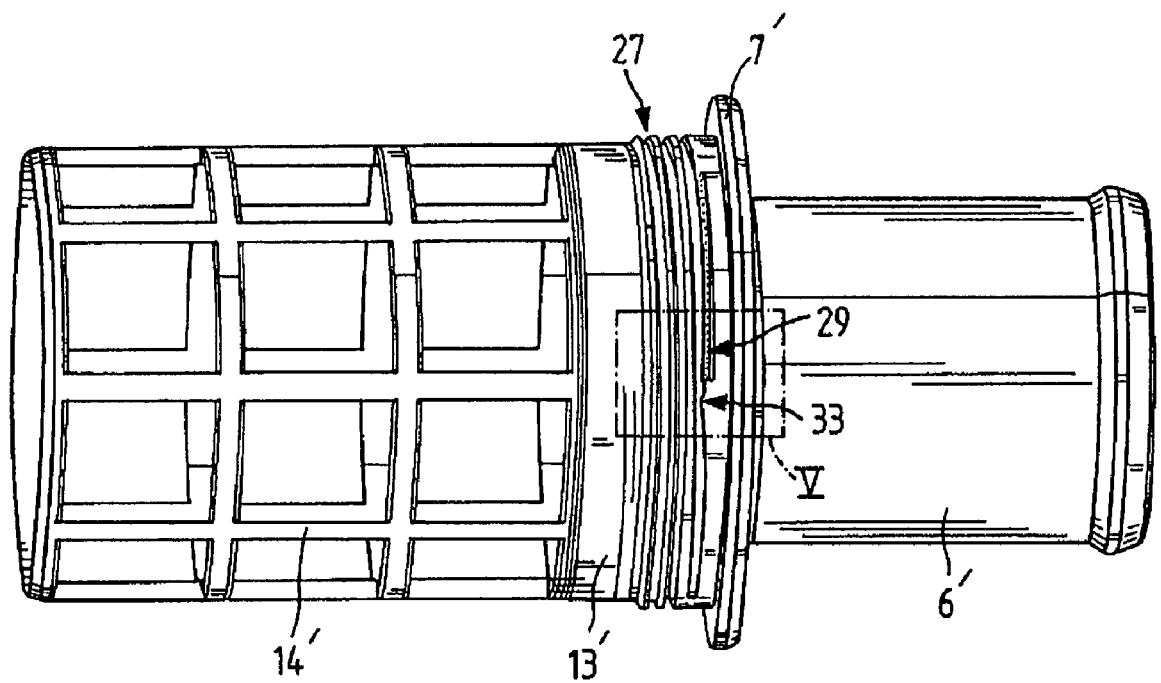
FIG. 4 shows an outlet fitting with a thread for screwing on a mounting ring.

FIG. 4 depicts a connection fitting 6' having an annular flange 7', a tube segment 13' and a support grid 14', the tube segment being provided with an external thread 27. The external thread 27 has a small pitch and enables the mounting ring 30 depicted in FIG. 6, which is provided with a corresponding internal thread 28, to be screwed onto the tube segment 13'. The radial shoulder 10 (see FIGS. 2 and 3) is received between the annular flange 7' and the mounting ring 30, such that a tight seal is formed at the point where the tube section 13' penetrates the shoulder 10. The mounting ring 30 has a radial flange 23'.

Figure 5:
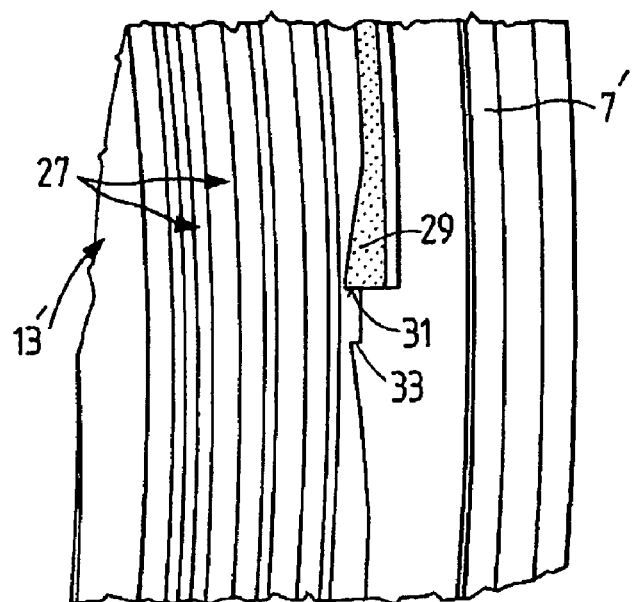
FIG. 5 is an enlarged detail view V from FIG. 4.
Figure 6:
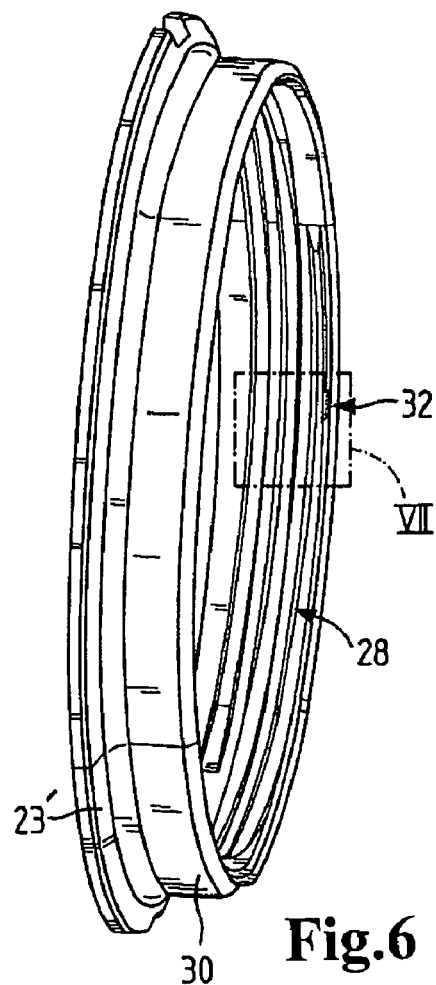
FIG. 6 is an enlarged perspective representation of the mounting ring.
Figure 7:
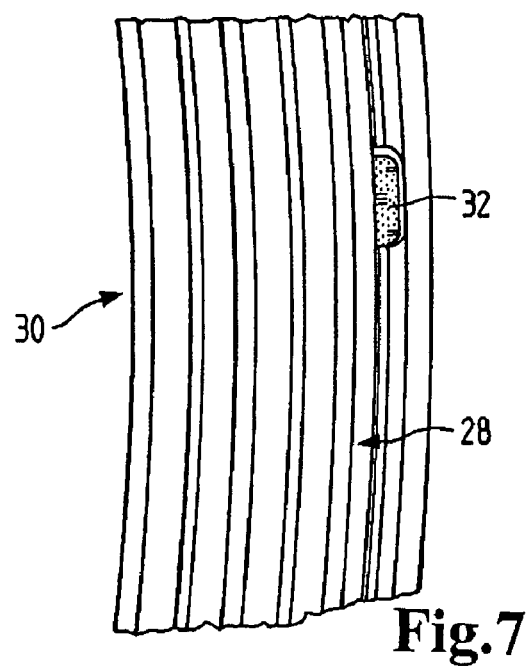
FIG. 7 is an enlarged detail view VII from FIG. 6.

As may be seen from FIGS. 4 and 6 and, in particular, the enlarged details depicted in FIGS. 5 and 7, the respective thread 27, 28 is provided with devices which prevent a reverse rotation of the mounting ring 30 relative to the tube segment 13' once a defined mounting state has been reached, i.e., the mounting ring 30 has been screwed onto the tube segment 13'. These devices comprise, on the one hand, a tab 29 extending along a thread section and disposed at the end of the external thread 27 adjacent the annular flange 7. The tab 29 is deflectable in axial direction of the tube segment 13' by a certain path if the latter is loaded in that direction. At the free end of the tab 29, the tab is provided with a locking edge 31. Spaced at a distance behind the locking edge 31 in thread direction, a stop 33 is formed.

On the other hand, the devices comprise a locking projection 32, which is formed on the internal thread 28, namely at its front end as seen in screw-on direction. The height of the locking projection 32 is axially dimensioned in such a way that there is sufficient play in the flight of the external thread 27 so that the mounting ring 30 can be easily screwed on.

When the tab 29 is reached, the locking projection presses the tab 29 toward the annular flange 7'. As soon as the locking projection 32 has fully passed the locking edge 31, the tab 29 springs back, so that the locking edge 31 engages the locking projection 32. This forms a lock against reverse rotation to secure the mounting ring on the tube fitting 13'. To prevent further rotation in screw-on direction in the predefined position, a stop 33 visible in FIG. 5 is provided.

As soon as the connection fitting 6, 6' is mounted to the housing 2 in the above-described manner, the filter cartridge 4 can be inserted into the housing 2, with the support grid 14, 14' protruding into the central space of the filter cartridge 4. The filter cartridge 4 is inserted far enough so that the end face closure 5 rests on the radial flange 23, 23' of the mounting ring 22, 30 and on support elements 21 on the inside of the end face 8 of the housing 2.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter apparatus comprising:
   a housing with an inlet opening formed therein and a further opening formed in a housing wall;
   a filter insert arranged in the housing in a flow path between said inlet opening and said further opening;
   an outlet fitting having a tube segment which protrudes through said further opening and a contact face for contacting the housing wall surrounding said further opening; and
   a mounting element affixed to said tube segment such that a region of the housing surrounding said further opening is clamped between the contact face of the outlet fitting and the mounting element;
   the mounting element comprising a mounting ring which is fixed to a lateral surface of the tube segment, the mounting ring having a radially outwardly directed flange against which rests one end of the filter insert.

2. A filter apparatus according to claim 1, wherein the contact face is formed on an annular flange of the outlet fitting.

3. A filter apparatus according to claim 1, wherein a snap-in or locking connection is provided to fix the mounting ring on the tube segment.

4. A filter apparatus according to claim 3, wherein at least one circumferential projection is formed on one of the tube segment and the mounting ring, said projection cooperating with a radial projection or a radial recess on the other of the tube segment and the mounting ring.

5. A filter apparatus according to claim 4, wherein both the tube segment and the mounting ring are provided with a circumferential projection, and an insertion taper and an inclined insertion surface are provided in front of the respective projection as seen in mounting direction.

6. A filter apparatus according to claim 4, wherein a wedge-shaped geometry is formed by inclined faces behind the respective projection or recess as seen in mounting direction.

7. A filter apparatus according to claim 6, wherein an annular groove delimited by the inclined face is provided on the tube segment and engages the projection formed on the mounting ring.

8. A filter apparatus according to claim 1, wherein the mounting ring is affixed to the tube segment by a threaded connection.

9. A filter apparatus according to claim 8, wherein the threaded connection is formed by an external thread on the tube segment and a mating internal thread on the mounting ring.

10. A filter apparatus according to claim 8, wherein the threaded connection is provided with devices which act as a lock against reverse rotation, said devices comprising at least one locking edge and a locking projection.

11. A filter apparatus according to claim 1, wherein the housing has an essentially cylindrical configuration, and the filter insert is constructed as a filter cartridge.

12. A filter apparatus according to claim 11, wherein the outlet fitting is disposed on an axial end face of the housing and is coaxial to the filter cartridge.

13. A filter apparatus according to claim 12, wherein a support grid arranged at the free end of the tube segment extends extending within the filter cartridge over at least a portion of the axial length of the filter cartridge.

14. A filter apparatus according to claim 12, wherein an axial segment is formed at an end face of the housing, said axial segment merging into a radial shoulder in which said further opening is formed.

* * * * *